W. KIESER.
DEVICE TO PREVENT SURGING IN CENTRIFUGAL COMPRESSORS.
APPLICATION FILED DEC. 11, 1914.

Inventor:
Walter Kieser,

UNITED STATES PATENT OFFICE.

WALTER KIESER, OF CHARLOTTENBURG, GERMANY, ASSIGNOR TO GENERAL ELECTRIC COMPANY, A CORPORATION OF NEW YORK.

DEVICE TO PREVENT SURGING IN CENTRIFUGAL COMPRESSORS.

1,194,188.

Specification of Letters Patent.

Patented Aug. 8, 1916.

Application filed December 11, 1914. Serial No. 876,694.

*To all whom it may concern:*

Be it known that I, WALTER KIESER, a citizen of the Swiss Republic, residing at Charlottenburg, Germany, have invented certain new and useful Improvements in Devices to Prevent Surging in Centrifugal Compressors, of which the following is a specification.

This invention relates to centrifugal air compressors and its object is to prevent surging of the air column flowing through the machine. This effect sometimes occurs when the volume of air passing through the compressor and the delivery pipe decreases below a predetermined value and at the same time the pressure exceeds a predetermined amount, as for instance when several air-consumption devices are suddenly shut off, and the consequent decrease of load of the compressor causes a rapid increase in its speed. To guard against this difficulty, my invention provides a blow-off valve in the delivery pipe with means for opening it automatically when the pressure exceeds the safe limit, and with means also for loading the spring of the speed governor of the motor which drives the compressor, so that said motor will not unduly increase its speed.

Figure 1:
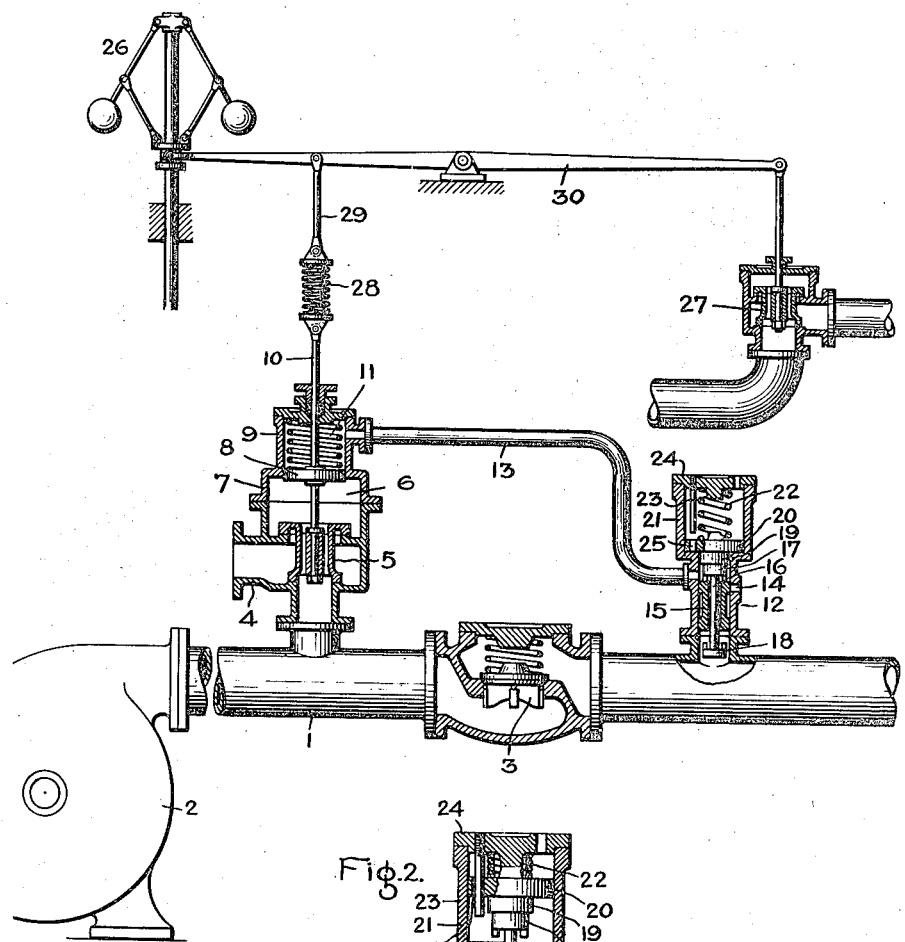
Figure 2:
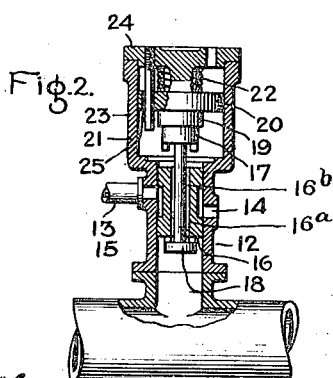

In the accompanying drawing, Figure 1 is a diagram illustrating the invention, and Fig. 2 is a section of the slide valve on a larger scale with certain of the parts in a different position from that of Fig. 1.

In the delivery pipe 1 of the compressor 2 is a check valve 3, which closes when a backward surge of air occurs in said pipe. A blow-off valve having a flanged discharge pipe 4 is connected with the pipe ahead of the check-valve. The double beat valve 5 has a passage through it to a chamber 6 in the valve casing 7. A piston 8 working in a closed cylinder 9 is exposed to the pressure in said chamber, and is secured to the stem 10 of the blow-off valve 5. A spring 11 opposes the pressure on the piston and normally holds the valve on its seat.

Connected with the pipe 1 beyond the check valve is a casing 12 which is connected by a pipe 13 with the cylinder 9 above the piston 8. In the side of the casing 12 is a vent 14, normally closed by a slide valve 15, which may be tubular and fitted to slide with some friction in the casing 12. A stem 16 passes loosely through an opening 16ª in this valve leaving an annular space 16ᵇ between the stem and the wall of the opening. This is best shown in the enlarged view of Fig. 2. The stem 16 has collars 17, 18 above and below it to actuate the slide valve 15 with some lost motion. A differential piston 19, 20 is attached to the stem 16, one piston working in the upper end of the casing 12 and the other in an enlarged cylinder 21 forming a continuation of said casing. A spring 22 urges said piston downward to keep the vent 14 closed by the valve 15. A stationary pin 23 fixed in the perforated cap 24 of the cylinder 21 enters a hole 25 in the piston 20, when the latter moves upward and the piston 19 leaves the casing 12. The pistons 19, 20 are guided to insure the correct registration of the pin and the hole. A speed governor 26 controls the admission valve 27 of the motor which drives the compressor. The speed governor is loaded by a spring 28 which is attached at one end to a link 29 pivoted to the governor lever 30. At the other end the spring is connected to the upper end of the stem 10 of the blow-off valve.

Fig. 1 shows the various parts in their normal positions. The slide valve 15 has been pushed down by collar 17 to a position where the vent 14 is closed. The cylinder 9 above piston 8 is connected to pipe 1 by way of pipe 13 and annular passage 16ᵇ, and the piston 19 is located in the upper end of casing 12.

When the pressure in the pipe 1 exceeds the admissible limit, the differential piston in the casing 12 is lifted against the tension of the spring 22 until, just as the collar 18 engages the slide valve 15, the larger piston 20 becomes exposed to the air pressure by the exit of the smaller piston 19 from the casing 12. The valve will, therefore, be quickly pulled upward, connecting the vent 14 with the pipe 13 and permitting more or less of the fluid pressure above the piston 8 to escape, the positions which the parts of the slide valve take being shown in Fig. 2. The air pressure on the underside of said piston instantly lifts it and opens the blow-off valve 5 to a greater or less extent, thereby relieving the abnormal pressure in the delivery pipe. At the same time, the additional compression of the spring 28 assists the speed governor in closing the admission valve 27 to prevent the driving motor from racing. When the piston 20 moves upward, the pin 23 enters the hole 25 and prevents any escape of the air pressure below said piston as it moves upward.

When the pressure in the delivery pipe is restored to normal, the differential piston 19, 20 descends, and upon the disengagement of the piston 20 from the pin 23, the air pressure under the piston will exhaust through the hole 25 and the perforation in the cap 24, so that the spring 22 will quickly move the valve 15 to the position where it closes the vent 14. This puts the pipe 1 in connection with the cylinder 9 through the annular passage 16$^b$ and pipe 13, thus balancing the pressures on the opposite sides of the piston 8, so that the spring 11 can close the blow-off valve and reduce the tension of the spring 28. The load on this spring, therefore, varies correspondingly with the changes of the blow-off valve.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. The combination with a motor driven centrifugal compressor, having an admission conduit and a discharge conduit, of a blow-off valve in the discharge conduit, means connected with the blow-off valve for opening it upon a predetermined increase in pressure, a regulator for the motor, and means associated therewith and operated upon the opening of the valve for moving the regulator to decrease the speed of the motor.

2. Means to prevent the surging of a motor-driven centrifugal air compressor, comprising a blow-off valve in the delivery pipe, a movable piston controlling said valve, and exposed to the pressure in said pipe, a device responsive to an increase in pressure in said pipe, and means controlled thereby for unbalancing the pressure on said piston.

3. Means for preventing surging in a motor-driven centrifugal air compressor, comprising a blow-off valve in the delivery pipe, a movable piston controlling said valve and exposed on both sides to the air pressure in said pipe, a vent on the side away from the valve, a valve controlling said vent, and a differential piston for moving said valve suddenly and exposed on one side to the pressure in said pipe.

4. Means for preventing surging in a motor-driven centrifugal air compressor, comprising a blow-off valve in the delivery pipe, a movable piston controlling said valve and exposed on both sides to the air pressure in said pipe, a vent on the side away from the valve, a valve controlling said vent, a differential piston for moving said valve suddenly and exposed on one side to the pressure in said pipe, and means for insuring rapid movement of the differential piston in opening the valve and for allowing it to move freely in closing.

5. Means for preventing surging in a motor-driven centrifugal air compressor, comprising a blow-off valve in the delivery pipe, a movable piston controlling said valve and exposed on both sides to the air pressure in said pipe, a vent on the side away from the valve, a valve controlling said vent, a differential piston for moving said valve suddenly and exposed on one side to the pressure in said pipe, means for insuring rapid movement of the differential piston in opening the valve and for allowing it to move freely in closing comprising a hole in the larger piston, and a stationary pin adapted to fill said hole when the piston has moved far enough to permit the air pressure to act upon it.

6. Means for preventing surging in a motor-driven centrifugal air compressor, comprising a blow-off valve in the delivery pipe, a movable piston controlling said valve and exposed on both sides to the pressure in said pipe, a vent for unbalancing said pressure to open the valve, a pressure-responsive device connected to the pipe and controlling said vent, a speed governor for the motor having a loading spring, and means for increasing the tension of said spring when the blow-off valve opens.

7. The combination with a centrifugal compressor having an admission conduit and a discharge conduit, of a non-return valve in the discharge conduit, a blow-off valve in the discharge conduit located in advance of said non-return valve as regards the flow of fluid, and a pressure actuated device responsive to the pressure beyond said non-return valve for opening the blow-off valve when the pressure reaches a predetermined value.

8. The combination with a centrifugal compressor having an admission conduit and a discharge conduit, of a non-return valve in the discharge conduit, a blow-off valve in the discharge conduit located in advance of said non-return valve as regards the flow of fluid, a pressure actuated device responsive to the pressure beyond said non-return valve for opening the blow-off valve, a motor for driving the compressor, a regulator therefor, and means for actuating the regulator to reduce the speed of the motor when the blow-off valve is opened.

In witness whereof, I have hereunto set my hand this fifth day of November, 1914.

WALTER KIESER.

Witnesses:
   WILLY VEÑMANN,
   ERNST KELLER.